June 21, 1932.   V. G. SOUDER ET AL   1,863,939
WING MOUNTING CLAMP
Filed July 2, 1931   2 Sheets-Sheet 1
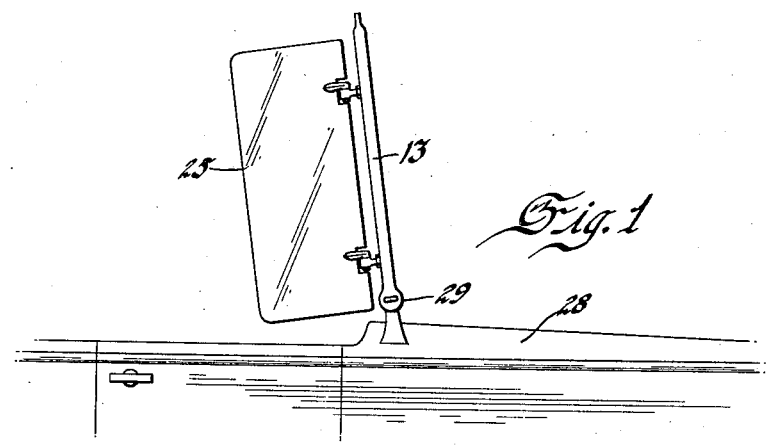
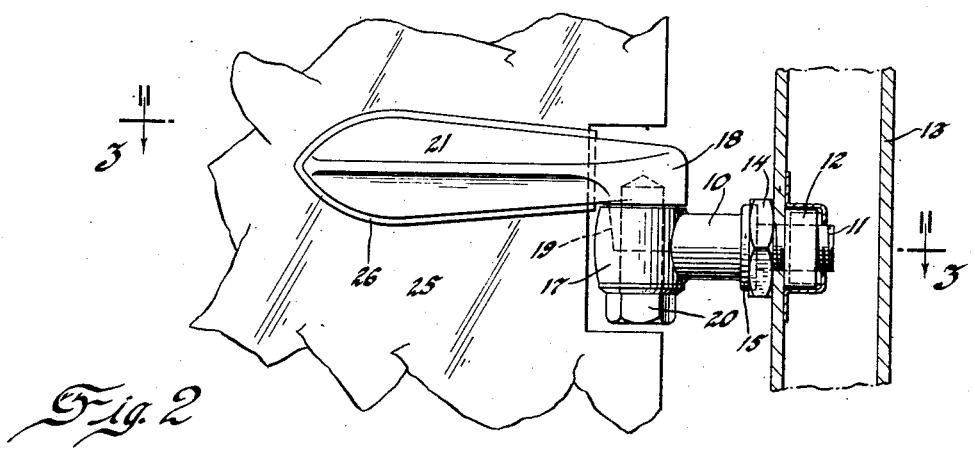
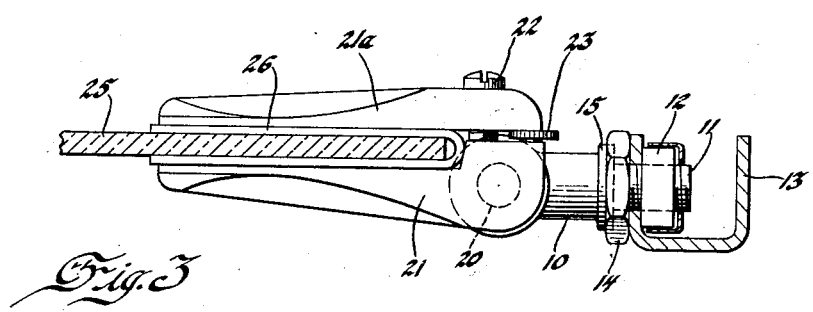
INVENTORS
Vernon G. Souder &
BY Herbert B. Trix
Francis D. Hardesty ATTORNEY Patented June 21, 1932

1,863,939

UNITED STATES PATENT OFFICE

VERNON G. SOUDER AND HERBERT B. TRIX, OF DETROIT, MICHIGAN, ASSIGNORS TO AMERICAN INJECTOR COMPANY, OF DETROIT, MICHIGAN, A CORPORATION OF MICHIGAN

WING MOUNTING CLAMP

Application filed July 2, 1931. Serial No. 548,391.

This invention relates to means for clamping glass side wings to windshield posts.

An object of this invention is a clamp which is universally adjustable and movable so that the wing can be moved around the post in all directions.

A still further object is a clamp which is so constructed as to have a satisfactory appearance and which includes means secured to the posts and swivelly secured to means for clamping the wing.

Still further objects will readily occur to those skilled in the art upon reference to the following description and the accompanying drawings in which Fig. 1 shows a windshield post provided with a wing secured in place by clamps of the invention.

Fig. 2 shows a clamp of the invention in use.

Fig. 3 is a section on the line 3—3 of Fig. 2.

Figure 4:
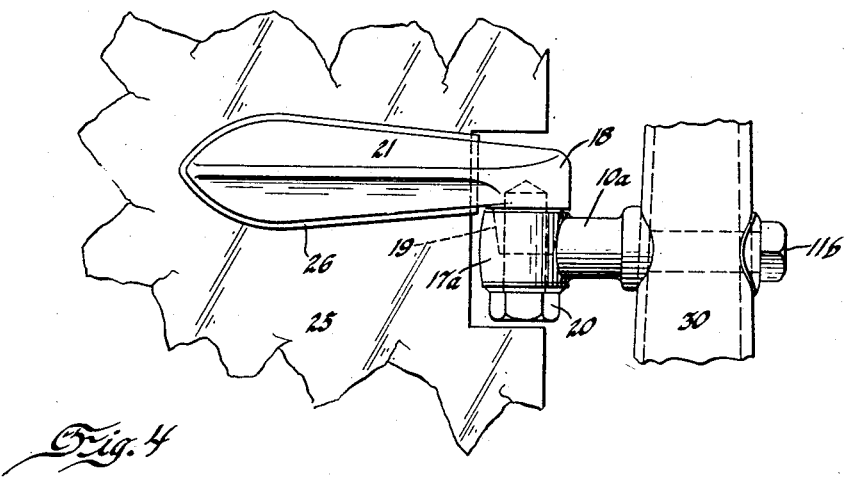
Fig. 4 is a view like that of Fig. 2 but showing a modified form of clamp.

Referring to the drawings, it will be seen that the clamp includes a stud 10 having a threaded end 11 which is adapted to be threaded into the anchored nut 12 of the windshield post 13, there being a sleeve nut 14 on the stud for taking up the play between the shoulder 15 on the stud and the surface of the post, the sleeve nut being recessed to receive the shoulder 15. The stud has a ring shaped end 17 whose axis is perpendicular to the axis of the threaded end and disposed within this ring shaped end is a clamp body part 18. The parts 17 and 18 are made conical, as indicated by the dotted line 19, and a screw bolt 20 passes thru the ring shaped end and into the body part to form a swivel connection between the body part and the post.

Integral with the body part is an elongated clamp portion 21 which projects from the bolt 20 at right angles to the axis of the latter and accordingly at right angles to the ring shaped end and the body part. Cooperating with the clamp part 21 is a second part 21a, similar in appearance and shape to the part 21 and secured to the body part by the adjusting screws 22 and 23, one of which, viz., 23, serves to pry them apart so that they will fulcrum upon the screw 22 and more effectively clamp the glass pane or glass wing 25 between them, or more accurately between the folds of a rubber strap 26.

When the parts are to be used to support a wing with respect to the windshield post 13, especially when the latter if folded down towards the automobile hood or cowl 28, there being provided in the post a swivel nut 29 for this purpose, the wing may be moved, with the clamp parts, upon the bolt 20 as an axis, the wings being hingedly connected with respect to the post.

Figure 5:
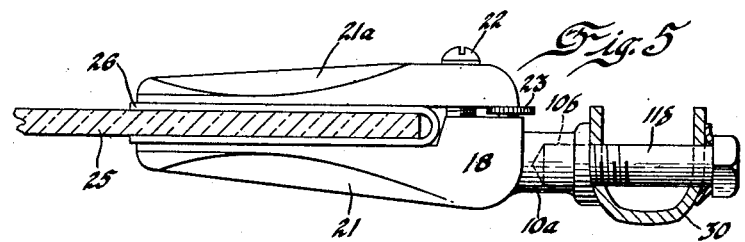
Fig. 5 is a view like that of Fig. 3 but showing the clamp of Fig. 4 in section.
Figure 7:
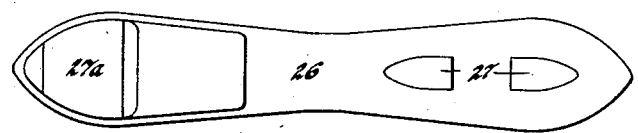
Fig. 7 shows a rubber strap for use with the clamp.

In Figs. 4 and 5 there is disclosed a clamp which is for use with a windshield post 30 having no anchoring nut like that shown at 12, in Figs. 2 and 3. The stud 10a of this modification is provided with a threaded bore 10b into which is threaded a screw bolt 11b, the latter passing thru the spaced sides of the post 30. The axis of the bolt 11b is perpendicular to the axis of the ring shaped end 17a of the stud and the other parts, viz., those listed 18 to 26 inclusive are identical with the same parts of the form of Figs. 2 and 3.

Figure 6:
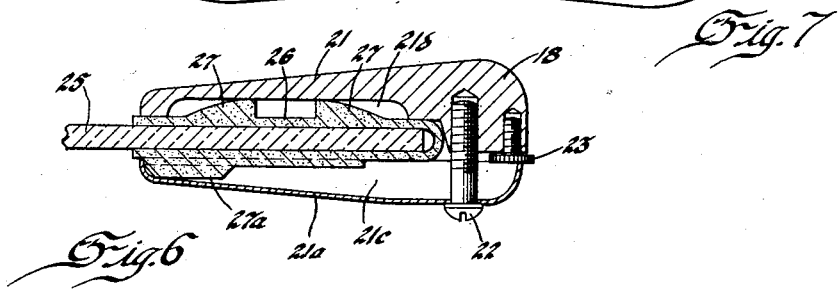
Fig. 6 is a sectional view of wing clamping parts.

In Fig. 6 the detailed construction of the clamp parts per se is disclosed. Referring to this figure, it will be seen that the clamp parts 21 and 21a are provided with hollows 21b and 21c, the clamp part 21a being in this instance of thin metal. The rubber strap 26 is shown as provided with lugs 27 disposed within the hollow 21b and with an enlarged lug portion 27a disposed within the hollow 21c, these lugs serving to anchor the folded strip in the clamp.

Now having described the invention and the preferred embodiment thereof, it is to be understood that the said invention is to be limited, not to the specific details herein set forth, but only by the scope of the claim which follows:

What we claim is:

Means for movably securing a glass wing to a windshield post comprising a stud having a threaded end and a ring shaped end whose axis is perpendicular to the axis of the threaded end, a body portion disposed in said ring shaped end, a bolt passed axially thru said ring shaped end and threaded into said body to hold the latter in place, the ring shaped end and the body having cooperating conical engaging formations for friction wedging purposes, an elongated clamp part integral with said body and projecting therefrom at right angles to the axis of the bolt, the ring shaped end and the body, a second elongated clamp part secured to the body by adjustable screws and spaced from the first part, and a folded rubber strip in the space between the clamp parts.

HERBERT B. TRIX.
VERNON G. SOUDER.